April 5, 1966  P. W. JACOBSEN  3,243,993
FLUID PRESSURE OPERATED SENSING HEAD
Filed May 15, 1963
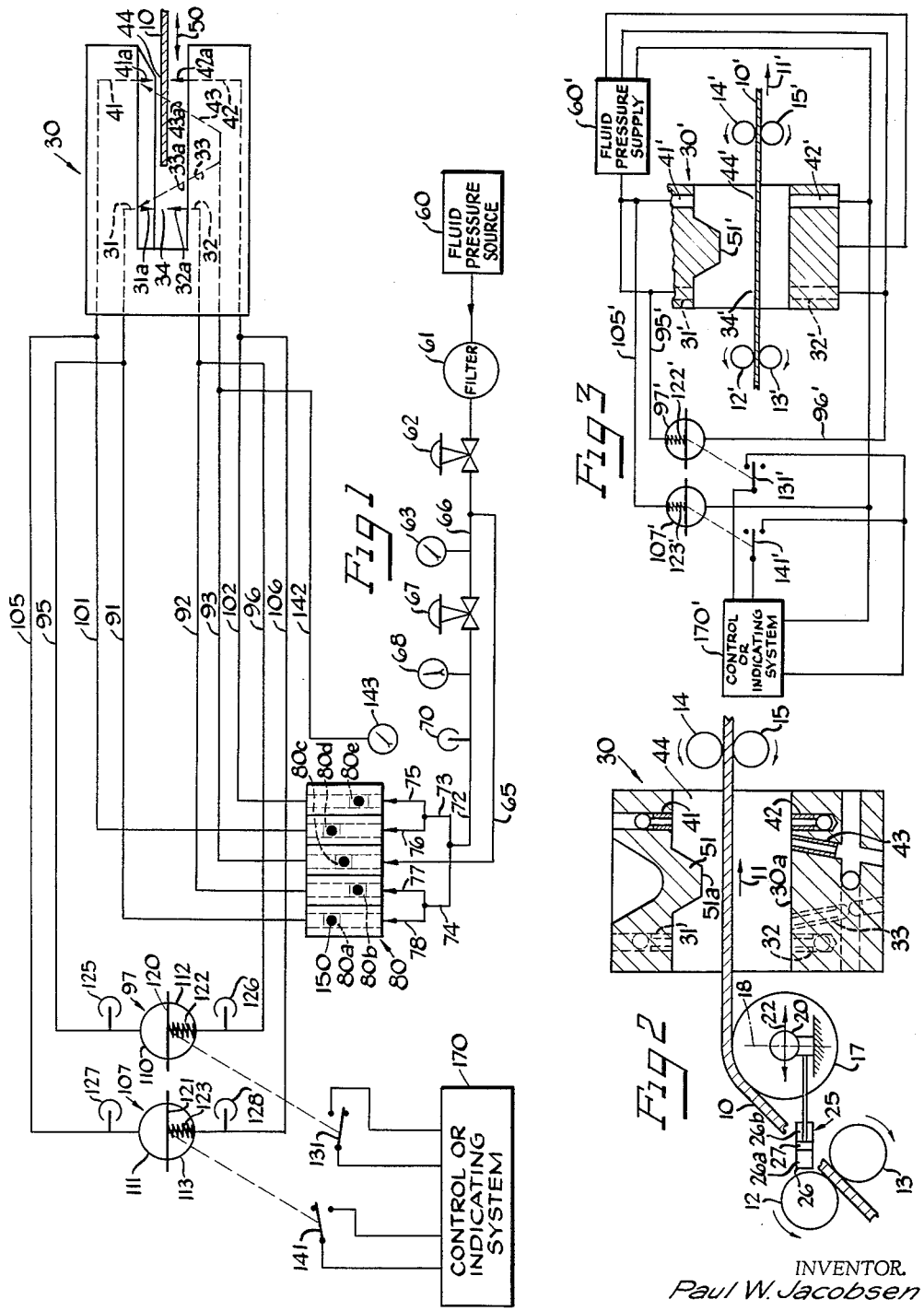
INVENTOR.
Paul W. Jacobsen
BY
ATTORNEYS United States Patent Office 3,243,993
Patented Apr. 5, 1966

3,243,993
FLUID PRESSURE OPERATED SENSING HEAD
Paul W. Jacobsen, Kiel, Wis., assignor to H. G. Weber and Company, Inc., Kiel, Wis., a corporation of Wisconsin
Filed May 15, 1963, Ser. No. 280,600
1 Claim. (Cl. 73—37.7)

This invention relates to a fluid pressure actuated sensing head and particularly, although not exclusively, relates to a sensing head for sensing changes in the lateral position of an edge of a longitudinally moving body of material. Such a sensing head may be used, for example, as part of an edge alignment control system which further includes means for shifting the moving body of material laterally to correct for errors in the lateral position of the edge of the material detected by said sensing head.

In one type of sensing system heretofore utilized a stream of water or air is directed toward a receiving or recovery line so as to sense the position of an edge of a fourdrinier wire or of a felt utilized in paper machinery. In this system the pressure in the recovery line varies with the degree to which the edge of the moving web of material intercepts the fluid stream. A bellows connected to the recovery line actuates a regulator valve associated with a web shifting device so that if the web deviates from a position where one half of the fluid stream is intercepted a compensating movement of the web automatically takes place.

It is an object of the present invention to provide a novel and improved fluid pressure actuated sensing head.

It is a further object of this invention to provide a sensing head which maintains its accuracy in spite of fluctuations in the pressure of the fluid supplied thereto.

Another object of the invention is to provide a sensing head of increased sensitivity.

A still further object of the invention is to provide a sensing head which insures against entry of foreign material into the sensing head to a greater degree than prior art systems of comparable sensitivity and accuracy.

Yet another object of the invention is to provide a highly sensitive and accurate sensing head which is extremely rugged and reliable and which has a high degree of flexibility and is readily adapted to operation with different operating conditions and for a wide range of purposes.

Other objects, features and advantages of the present invention will be apparent from the following detailed description taken in connection with the accompanying drawings, in which:

FIGURE 1 is a schematic illustration of a sensing head and an associated fluid circuit particularly adapted for sensing the lateral position of a moving web of material and embodying the novel concepts and teachings of the present invention;

FIGURE 2 is a transverse sectional view of the sensing head of FIGURE 1 and is substantially a drawing to scale of an actual sensing head; and FIGURE 3 is a view similar to FIGURE 2 but showing a two jet type sensing head and circuit which constitutes a different embodiment of the present invention.

FIGURES 1 and 2 illustrate a preferred embodiment which presently represents the best mode of practicing the invention. FIGURE 3 shows a more elementary system which attains some but not all of the advantages of the embodiment of FIGURES 1 and 2. The system will be described, by way of example only, as applied to the problem of edge position sensing, but it should be understood that a wide range of other applications is contemplated for sensing heads in accordance with the present invention.

In the embodiment of FIGURES 1 and 2, a web 10 such as a fourdrinier wire or a felt of a paper machine is driven in the direction of arrow 11 by any suitable means such as diagrammatically indicated by cooperating pairs of driven rollers 12, 13 and 14, 15 in FIGURE 2. The lateral position of the web may be controlled by means of a guide roll 17 which may have its bearing at one side mounted for pivotal movement on a vertical axis indicated at 18 and may have its opposite bearing indicated at 20 in FIGURE 2 mounted for linear reciprocation in a horizontal plane as indicated by double headed arrow 22. The shaft of guide roll 17 must, of course, be axially slidable in bearing 20 to accommodate the reciprocation of the bearing. Suitable means have been indicated at 25 for shifting bearing 20 horizontally and may comprise a hydraulic cylinder 26 having a piston 27 mechanically coupled to the bearing 20.

A sensing head 30 may be disposed relatively close to a supported portion of the web 10 such as the portion of the web supported by guide roll 17. The sensing head 30 of FIGURES 1 and 2 has a plurality of sets of multiple cooperating fluid jets, each set of fluid jets being responsive to the presence or absence of a material. In the illustrated embodiment the jets are located on opposite sides of a receiving space so that a material interposed in the receiving space acts as a complete or partial fluid barrier depending on its permeability to the fluid and prevents interaction of the jets.

In the illustrated embodiment, there are three jets in each cooperating group, one on one side of a receiving space and two on the opposite side. Two sets of such cooperatnig jets are shown. Specifically the two sets of cooperating jets have respective fluid jet defining means 31, 32 and 33 and 41, 42, 43, FIGURE 2. The fluid jet means 31–33 and 41–43 may comprise suitable fluid nozzles or conduits having fluid passages terminating in fluid orifices for delivering fluid in a stream or jet into respective material spaces 34 and 44. The axes of the fluid jet means 32, 33 and 42, 43 may be directed toward the fluid jet means 31 and 41, respectively, so that in the absence of a material in the receiving spaces 34 and 44, the fluid jets diagrammatically indicated at 32a, 33a and 42a, 43a in FIGURE 1 converge adjacent the orifices of fluid jet means 31 and 41, respectively, so as to create fluid barriers across the orifices of fluid jet means 31 and 41 which inhibit discharge of fluid from fluid jet means 31 and 41.

In FIGURE 1, jet means 32, 33 and 42, 43 have been shown as lying in a plane transverse to the direction of web movement indicated by arrow 11, however, in an actual physical embodiment the jet means 32, 33 and 42, 43 may preferably lie in respective offset planes directed longitudinally of the direction of web movement as shown in FIGURE 2. The actual arrangement of FIGURE 2 is preferred since it enables the jets 31a–33a and 41a–43a to be very closely spaced in the lateral direction indicated by double headed arrow 50 in FIGURE 1. For example, the actual lateral separation of the planes of jet means 32, 33 and 42, 43 in FIGURE 2 may be about ⅛ inch as measured between a plane intersecting the central axes of jet means 32 and 33 and a plane intersecting the central axes of jet means 42 and 43 where the jet means have fluid passages and orifices of about 1/16 inch diameter.

As shown in FIGURE 2, the axes, of jet means 31, 32 and 41, 42 may be offset in the longitudinal direction indicated by arrow 11 by a distance of about one inch. Thus an isolating rib 51 may be interposed between the orifices of jet means 31 and 41 to prevent interaction between the two groups of jets 31a–33a and 41a–43a. The clearance between the inner face 51a of rib 51 and the opposite surface 30a of the head may be about ¾ inch.

As illustrated in FIGURE 1, where a gas such as air is supplied to the jet means, a plant air source 60 of about 70 pounds per square inch above atmospheric pressure may be used as a source of fluid under pressure. Air is supplied through filter 61 and pressure reducer 62 which may reduce the pressure to 60 pounds per square inch at gage 63. A pilot pressure line 65 is connected to the outlet side of pressure reducer 62 for providing a relatively high pressure which is eventually supplied to jet means 33 and 43. The outlet of pressure reducer 62 is also connected via a line 66 through a pressure reducer 67 which may reduce the pressure to 20 pounds per square inch as indicated by gage 68. A relief valve may be provided as indicated at 70 which is actuated by a pressure above 25 pounds per square inch. Line 72 at the outlet side of pressure reducer 67 branches into lines 73 and 74 and then into lines 75–78 which together with line 65 lead to respective flow metering orifices of a flow meter 80. By way of example, the flow meter may have a series of passages receiving the respective input lines and having metering orifice inserts therein each approximately 5/16 inch in diameter and 1/2 inch long. The inserts may have a snug push fit into the respective passages. Precise orifice diameters are best determined empirically for a given physical system with given lengths of line and the like.

The metering orifices are so proportioned that output lines 91 and 101 have a lesser static pressure as sensed at lines 95 and 105 than the static pressures of lines 92 and 102 as sensed at lines 96 and 106. These static pressures are with respect to the condition where the receiving spaces 34 and 44 are completely unobstructed. Output line 93 is shown as connected with jet means 33 and 43 and has a sufficient flow velocity to cause the static pressure in lines 95 and 105 to greatly exceed the static pressure in lines 96 and 106 when the jets 33a and 43a are present adjacent the orifices of jet means 31 and 41.

In the specific illustrated system, differential pressure operated switches 97 and 107 are provided having chambers 110 and 111 referenced to lines 95 and 105 and having chambers 112 and 113 referenced to lines 96 and 106. Diaphragms 120 and 121 separate the respective chambers and are acted upon by compression springs 122 and 123 in chambers 112 and 113. Relief valves 125, 126, 127 and 128 in lines 95, 96, 105 and 106 may be set to open at 5 pounds per square inch pressure above atmospheric pressure. The devices 97 and 107 include electric switches 131 and 141 which are actuated in accordance with the differential pressure conditions between chambers 110, 112 and 111, 113. Commercially available switches of this type are available for actuation by differential pressures corresponding to .15 to .5 inch of water.

In establishing a system for a given application, pressure gages may be associated with each of the static pressure lines 95, 96, 105, 106, so that metering orifices for flow meter 80 may be selected which balance the static pressures in these lines under the different operating conditions intended. A static pressure line 142 and gage 143 may also be associated with the line 93 leading to jet means 33 and 43 so as to determine static pressure adjacent these nozzles.

By way of example, jets 31a and 41a may first be established with a material occupying the receiving zones 34 and 44. The metering orifices of flow meter 80 associated with lines 91 and 101 may then be adjusted to provided predetermined equal static pressure readings in lines 95 and 105, for example at 2.5 pounds per square inch. With zones 34 and 44 still completely obstructed, the metering orifices associated with lines 92 and 102 may then be adjusted to give equal static pressure readings greater than the pressure readings at lines 95 and 105 and sufficient to place diaphragms 120 and 121 in their upper positions as viewed in FIGURE 1 with a suitable adjustment of the force of compression springs 122 and 123. Thereafter, a metering orifice would be selected in flow meter 80 with respect to output line 93 such that with the zones 34 and 44 completely unobstructed, the static pressure in lines 95 and 105 would become sufficient to overcome the bias of spring 122 and 123 in conjunction with the static pressure in lines 96 and 106 so as to actuate devices 97 and 107.

As indicated in FIGURE 1, the static pressure lines 95, 96, 105, 106 preferably tap lines 91, 92, 101, 102 as close to the sensing head 30 as is practicable so that pressure fluctuations at source 60 have a minimum effect as sensed by devices 97, 107. For example, the cable including lines 91, 92, 93, 95, 96, 101, 102, 105, 106 and 142 may have a length of the order of 45 feet. The static pressure tap connections between the indicated pairs of lines may then take place in succession along a further few feet of the cable just prior to the sensing head 30.

By way of example, the lines such as indicated at 91, 92, 93, 101 and 102 may comprise 1/8 inch outside diameter plastic tubing such as known under the trademark "Nylaflow." The passages within the sensing head 30 preferably have comparable inside diameters, for example .084 inch so that the velocity of flow is maintained continuously through the system to the jet orifices opening at the receiving zones 34 and 44. To facilitate machining, larger diameter passages, for example 1/4 inch in diameter may be drilled in the sensing head and tubular inserts having outside diameter of 1/4 inch an inside diameter of .084 inch may then be inserted. Similarly, the generally vertically extending passages of the fluid jet means 31–33 and 41–43 may initially be formed by drilling passages of 1/8 inch diameter which then receive stainless steel tubular inserts having 1/8 inch outside diameter, .063 inch inside diameter and a length of at least 3/16 inch for jet means 31, 32, and 41, 42 and a length of at least about 3/8 inch for jet means 33 and 43. The orifice ends of the tubular inserts for jet means 33 and 43 may have a 10° bevel so that the ends thereof defining the orifices will lie flush with surface 30a. By maintaining the velocity of the fluid throughout the system, the entrance of foreign matter into the interior passages of the sensing head is made very unlikely. Further, the jets 31 and 41 are directed generally normally to the plane of the web and generally towards the jets 32a, 33a and 42a, 43a so as to positively resist the forcing of foreign material into the jet means 31 and 41 even though the zones 34 and 44 may be unobstructed. Further, of course, the static pressure lines which do not involve rapidly moving fluid are entirely offset with respect to the axes of jet means 31 and 41 so that there is no possibility of forcing foreign matter directly into the static pressure lines such as 95 and 105.

By way of example, the differential pressure actuated switch devices 97 and 107 may be of the type available commercially from F. W. Dwyer Manufacturing Company, bulletin E–40, Series No. 1800, model 1800 (0.15 inch to 0.5 inch of water differential pressure actuated).

Once the parameters for a given system have been empirically determined for a given application as heretofore specified, further apparatus of the same type will normally omit the various gages such as indicated at 63, 68 and 143. The use of such gages and adjustable flow regulators and pressure reducers is valuable, of course, for adapting the system to different applications and for demonstrating the principles of the system.

The metering orifices such as indicated at 80a–80e may be retained in the passages of flow meter 80 by suitable set screws such as indicated at 150, and once the correct diameters for such orifices has been determined, the gages and the like will be unnecessary in producing other identical apparatus.

The switches 131 and 141 may control the energization of suitable solenoid valves for directing hydraulic fluid or preferably air under pressure to the respective actuating chambers of cylinder 26 which is preferably pneumatically operated where the sensing head 30 is pneumatically operated.

By way of example, when the two solenoid valves controlling the cylinder 26 are deenergized, both actuating chambers of the cylinder are connected to atmosphere. When switch 131 is closed indicating an obstruction in zone 34, pressure is supplied to the left-hand actuating chamber 26a of cylinder 26 advancing bearing block 20 in the direction of the web movement indicated by arrow 11 and tending to shift the web laterally to the right as viewed in FIGURE 1 to remove the obstruction from zone 34.

Similarly, if switch 141 is closed indicating removal of the obstruction from zone 44, the other solenoid valve is actuated applying pressure to chamber 26b at the right-hand side of cylinder 26 moving bearing block 20 in the direction opposite to the direction of web movement until the web moves laterally to the neutral range of positions corresponding to the position indicated in FIGURE 1 where the web obstructs zone 44 but does not obstruct zone 34, returning switches 131 and 141 to the open condition shown.

*Summary of operation of the embodiments of FIGURES 1 and 2*

Referring to FIGURE 1, when the web 10 has a lateral edge obstructing zone 44, the web intercepts fluid jets 42a and 43a. In this condition, the static pressure in line 102 as sensed by line 106 together with the force of spring 123 exceeds the static pressure in line 101 as sensed by line 105, so that diaphragm 121 of pressure actuated switch device 107 is in an "up" condition with switch 141 open and the control or indicating system 170 in a passive condition.

Similarly, with zone 34 not obstructed by the web 10, the pilot jet 33a together with jet 32a produces a fluid barrier adjacent the orifice of fluid jet means 31 which maintains a relatively high static pressure in line 91 as sensed by line 95 so that the pressure in chamber 110 of pressure actuated switch 97 exceeds the pressure of chamber 112 referenced to line 92 together with the force of compression spring 122. Thus, switch 131 is likewise maintained in an open condition. If web 10 obstructs zone 34, pressure actuated switch 97 acts to close contact 131 to tend to shift the web 10 to the right as viewed in FIGURE 1, while if web 10 moves out of obstructing relation in zone 44, pressure actuated switch 107 is operated to close contact 141 and move web 10 laterally to the left.

*Embodiment of FIGURE 3*

FIGURE 3 illustrates an embodiment which is more rudimentary than the embodiment of FIGURES 1 and 2 but which still achieves the advantage of minimizing the possibility of the entrance of foreign matter into the sensing head. The sensing head 30' of FIGURE 3 is essentially identical to the sensing head of FIGURE 2 with the exception that the pilot jet means 33 and 43 are omitted. The jet means 31' and 32', and 41' and 42' are still maintained at high velocity throughout the interior of the sensing head and are preferably arranged with the axes of the respective orifices in direct alignment as shown so that the weaker jets directly oppose the forcing of foreign matter into the sensing head by the stronger opposing jets.

In this double jet type embodiment, the static pressure of the stronger jets 32' and 42' normally when the jets are obstructed overcomes the weaker jet static pressure together with the compressive force of compression springs 122' and 123'. When, however, zones 34' and 44' are unobstructed, the jets 32' and 42' act to produce a fluid barrier adjacent the orifices of the weaker jets 31' and 41' so as to increase the pressures in the upper chambers of switches 97' and 107' so that these increased pressures together with the forces of compression springs 122' and 123' overcome the static pressure associated with the stronger jets 32' and 42'.

The remaining components of the system have been given corresponding primed reference numerals and the operation of the system of FIGURE 3 will thus be apparent from a consideration of the description of FIGURES 1 and 2.

It has been found that while the system of FIGURE 3 has the advantage of minimizing the possibility of foreign matter entering the sensing head, the system of FIGURE 3 has some tendency to be irratic or unstable in comparison to the high degree of stability and reliability of the system of FIGURES 1 and 2. In other words, the introduction of the third jet makes possible the selection of an independent parameter which greatly simplifies the design of the system and makes the same much more stable and reliable.

It will be apparent that the system as disclosed is not limited to edge alignment control or the like, since the system as illustrated can sense dimensions of parts and define whether the parts are of a correct length, for example, a greater length than the determined range, or a lesser length than the determined acceptable range. It is apparent that the heads of the present invention can be made responsive to the permeability of material to fluid jets. Further, the three jets of a triple jet head or the two jets of a double jet head may be located on the same side of a surface whose height, for example, is to be determined the surface if sufficiently close to the orifice of the weakest jet deflecting the other one or two jets against the orifice of the weaker jet to produce the same type of fluid barrier as in the illustrated embodiments. Such a system might be adapted to sensing thicknesses of articles (all supported on a common horizontal surface and moved in a horizontal plane under the jets, for example). Many other applications become apparent based on the concept of one and preferably two or more jets acting to produce a fluid barrier or to cooperate with a material barrier to produce a fluid barrier adjacent the orifice of a further sensing jet. A single jet may sense thickness where the article surface itself reflects the jet in such a way as to create a substantial fluid barrier at the orifice of the single jet.

In my prior Patent No. 2,860,841, I have disclosed a single orifice type sensing head for cooperation with a moving web. The concept in said patent was to provide a gentle fluid stream which would not deflect the web. Pressure responsive devices were provided for sensing the change in static pressure produced by the presence of the web pressing against the discharge orifice in greater or lesser degree depending upon the location of the web edge and how much of the area of the discharge orifice is covered or uncovered by the web. It was necessary that a low velocity stream be produced which would not deflect the web. A basic concept of the present invention is to utilize the web as a shield or deflector for one or more control jets which in one operating condition produce a fluid barrier which increases the static pressure of the sensing jet. Another and broader concept disclosed herein is to use a firmly supported web or a rigid material as a reflector which coacts with a single high velocity sensing jet. The higher velocities of the order of 50 cubic feet per hour contemplated in the present case greatly reduce the possibility of foreign matter entering the system. Furthermore it may be theorized that the high velocity stream herein contemplated is reflected by the firmly supported non-deflectable web so as to produce a fluid barrier between the discharge orifice and the web comparable to that produced by additional control jets in the preferred embodiment. In the single jet sensing head, the web or other material is supported for travel along a path spaced a small distance, for example less than about one-fourth inch, from the plane of the discharge orifice. This corresponds to the height of rib 50 in FIGURE 2 which prevents the web from getting close enough to jets 31 and 41 to appreciably change the internal static pressure thereof in the preferred embodiment.

While it has been specified that the spacing between the planes of jets 32, 33 and 42, 43 is ⅛ inch, it will be apparent that the effective spacing of the cooperating jets of the two groups may be effectively increased or decreased with respect to the direction at right angles to the edge margin of the web 10 by pivoting the entire sensing head 30 on a vertical axis. Thus, it is not necessary that the edge margin of the web be parallel to the planes of jets 32, 33 and 42, 43. Said planes may extend at any desired acute angle to the marginal edge of the web 10. This, of course, greatly increases the flexibility of a given sensing head such as illustrated in FIGURE 2 or FIGURE 3.

*Preferred example in accordance with the embodiment of FIGURES 1 and 2*

While the previously described example in accordance with the embodiment of FIGURES 1 and 2 is considered operative for certain purposes, substantial improvements over the previous example have been made which together constitute the presently preferred example with respect to the embodiment of FIGURES 1 and 2 for the presently contemplated commercial application of the system.

(1) It is found that springs 122 and 123 of FIGURE 1 may be omitted completely from the diaphragm pressure switches 97 and 107. In the preferred example, therefore, only the differential in air pressures between the respective chambers of the switches 97 and 107 are utilized to actuate the electric contacts 131 and 141. For the particular application contemplated it was considered that the springs were unnecessary and detracted from the sensitivity of the diaphragm differential pressure switches. In different applications from that presently contemplated, however, weak compression springs such as indicated at 122 and 123 may be employed so that in the event of complete air failure, the diaphragm switches will drift into the position dictated by the springs 122 and 123 to shut off some machine or plant operation or start up some machine or plant operation as may be desired where there is a complete failure in the supply of air from the general source such as indicated at 60 in FIGURE 1.

(2) In the particular application contemplated, sleeves such as indicated in FIGURE 2 for providing jets 31, 32 and 41, 42 were omitted so that the differential jets 31, 32 and 41, 42 were provided with a ⅛ inch diameter while the pilot jets 33 and 43 retained a ¹⁄₁₆ inch diameter as in the previous example in accordance with FIGURES 1 and 2. The arrangement of the present example gave a greater flow in the differential jets 31, 32 and 41, 42 at lower pressures that resulted in faster reaction times in sensing changes in web position. Leaving the pilot jets with ¹⁄₁₆ inch diameter passages provides better control of impingement of the pilot jet on the ⅛ inch diameter differential jets 31 and 41 since the pilot jets 33 and 43 tend to produce diverging streams therefrom and any increase of diameter of the pilot jets in the specific application contemplated would simply waste air at any diameter beyond the ⅛ inch diameter of the orifices of the sensing jets 31 and 41 which receive the impact from the pilot jets 33 and 43.

(3) In the preferred example, all of the supply lines have a ¼ inch outside diameter rather than the ⅛ inch outside diameter of the previous example. The tubing of the preferred example was a plastic tubing known as "Poly-Flo" tubing. It is found that the larger diameter tubing provides a faster reaction time to changes in web position. For an even faster reaction time, even larger size tubing may be desirable in certain applications.

(4) In the preferred example, the differential pressure receiving lines 95, 96, 105, 106 and 142 connect with the respective lines 91, 92, 101, 102 and 93 at points near the flow meter 80 rather than at points near the sensing heading 30 as in the previous example. By connecting the static pressure lines remote from the sensing head 30, only five supply lines 91, 92, 93, 101, and 102 need extend for the long run from the control housing containing flow meter 80 to the sensing head 30. It was found that for the presently contemplated application the static air pressures obtained near flow meter 80 were not in excess of the permissible working pressures of the diaphragm switches 97 and 107 so that it was not necessary to take advantage of the friction loss in the long tubing runs from the flow meter 80 to the sensing head 30 as in the previous example. In the preferred example, the overall volume of air in the system is reduced, and consequently the speed of the reaction to changes in web position is increased.

In addition to the reduced reaction time, there is the physical advantage of having only five lines instead of ten in the conduit leading from the flow meter 80 to the sensing head 30. Further, the special brass junction units for coupling the static pressure lines to supply lines 91, 92, 93, 101 and 102 are eliminated to reduce fabrication and assembly costs. With longer distances between the flow meter 80 and the sensing head 30, for example 100 feet or more, it may be necessary to utilize the system described in connection with the prior example since the static pressures adjacent the flow meter 80 may be too high for the particular diaphragm actuated switches such as indicated at 97 and 107.

A sensing head in accordance with the preferred example has been found to operate successfully even when completely submerged under water. Foreign matter was prevented from entering the system just as when the sensing system operated in the atmosphere.

Even when the sensing jets 31 and 41 have a ⅛ inch diameter, it is found that the lateral spacing between the sets of three jets may still be approximately ⅛ inch with respect to a direction at right angles to the planes of the cooperating jets as viewed in FIGURE 2. It is found that increasing the diameter of the sensing jets 31 and 41 does not reduce the sensitivity of the sensing head to the position of the edge of the web. The sensing head still responds to a change of web position of between ¹⁄₆₄ inch and ¹⁄₃₂ inch. In other words, if the sensing head 30 as shown in FIGURE 2 is rotated on a vertical axis until the effective separation between the two sets of jets in the lateral direction as indicated by arrow 50 in FIGURE 1 is of the order of ¹⁄₃₂ of an inch, there would still be a neutral position of the edge of the web as indicated in FIGURE 1 where jets 42 and 43 would be effectively obstructed and jets 32 and 33 would be effectively unobstructed. Movement of the edge of the web to the right as viewed in FIGURE 1 a distance of ¹⁄₃₂ of an inch would then be effective to actuate switch 107 and close contact 141, while movement of the edge of the web from the intermediate position to the left as viewed in FIGURE 1 a distance of ¹⁄₃₂ of an inch would be effective to actuate switch 97 and close switch contact 131. The sensing head 30 may, of course, be rotated on a vertical axis in the opposite direction so as to increase the effective spacing between the two sets of jets up to a spacing, for example, of ¾ inch where the jets have a spacing of one inch in the direction of arrow 11 for the orientation of the sensing head 30 shown in FIGURE 2.

Where the plastic tubing forming lines 91, 92, 93, 101, and 102 was ⅛ inch outside diameter, the connecting passages in the sensing head were described as having an inside diameter of .084 inch, for example provided by tubular inserts having an outside diameter of ¼ inch. Where the tubing has an outside diameter of ¼ inch, these inserts having an inside diameter of .084 inch will be omitted. The passages within the sensing head connected with the ¼ inch outside diameter tubing may have ¼ inch diameter up to a point within a few inches of the discharge orifices of the respective jets 31–33 and 41–43. The remaining few inches of the passages within the sensing head may have a ⅛ inch diameter connecting with the ⅛ inch diameter sensing jets 31, 32 and 41, 42 and connecting with the ¹⁄₁₆ inch pilot jets 33, 43. This will provide a couple of inches of high velocity air at the same diameter as the sensing jets 31, 32 and 41, 42 for preventing the entry of foreign matter into the sensing jets 31, 32 and 41, 42.

By way of example of specific pressures and rates of flow, utilizing ¼ inch outside diameter "Poly-Flo" tubing having a length of 50 feet from the flow meter 80 to the sensing nozzle 30, the following test results are given. While the preferred example deals with a 50 foot length of tubing for lines 91, 92, 93, 101 and 102, this is considered a relatively unusual length, and many applications will require only a 20 foot length of these lines or less.

With 50 foot lines of ¼ inch outside diameter plastic tubing (inside diameter about .2 inch), the system was set in operation with the following observed conditions. A static pressure of 50 pounds per square inch was observed in the line corresponding to line 65 of FIGURE 1 immediately upstream from a Brooksmite flow meter corresponding to flow meter 80 in FIGURE 1. The Brooksmite flow meter showed a flow rate of 60 cubic feet per hour at orifice 80c leading to the pilot line corresponding to line 93 in FIGURE 1. The static pressure at the pilot line corresponding to line 93 about one foot from the sensing head 30 was found to be 17 pounds per square inch above atmospheric pressure. The pilot jets corresponding to jets 33 and 43 as previously mentioned had an inside diameter of ¹⁄₁₆ inch. The sensing jets as previously mentioned had a ⅛ inch inside diameter. Upstream from the Brooksmite flow meter at points corresponding to lines 76 and 78 in FIGURE 1, static pressures of three pounds per square inch above atmospheric pressure were measured. With the pilot obstructed, the static pressure measured one foot from the sensing head in lines 91 and 101 was found to be five ounces per square inch or 8.67 inches of water while the Brooksmite flow meter indicated flow rates at orifices 80a and 80d of 30 cubic feet per hour.

With the flow rate to lines 91 and 101 increased at 50 cubic feet per hour as measured by the Brooksmite flow meter at 80a and 80d, and with the pilot jets unobstructed and impinging on the sensing jets 31 and 41, the static pressure in lines 91 and 101 one foot from the sensing head 30 was found to be 12 ounces per square inch above atmospheric pressure corresponding to 20.82 inches of water.

With the orifice 80c completely open but with a static pressure still at about 17 pounds per square inch in the pilot line 93 one foot from the sensing head 30, a static pressure of 25 ounces per square inch or 43.38 inches of water was measured in sensing lines 91 and 101 one foot from the sensing head 30 with the pilot jets unobstructed and impinging on the sensing jets 31 and 41. Thus, in the test system, even with a maximum fluid barrier at sensing jets 31 and 41, the static pressure of three pounds per square inch upstream from the Brooksmite flow meter, corresponding to 83.28 inches of water still greatly exceeded the static pressure one foot from the sensing head 30 in the sensing lines 91 and 101 so that an adequate flow of air out of the sensing jets 31 and 41 was still obtained.

Under the foregoing conditions with a sensing flow of 50 cubic feet per hour and a maximum pilot flow, reaction time of 2 seconds was observed in responding to a change of position of the web. A reaction time of within 3 seconds was observed even when the sensing head was completely submerged in a bucket of water. It was considered that the test system would provide excellent results even with 50 foot lines from the control cabinet to the sensing head. As a result of these and similar tests, it was concluded that a reaction time of .2 second was obtainable with 10 foot lines of ½ inch inside diameter tubing, .75 second with 50 feet of ½ inch inside diameter tubing, 2 seconds with 50 feet of ¼ inch outside diameter plastic tubing and one second with 10 feet of ¼ inch outside diameter plastic tubing. The accuracy of web detection was considered to be between ¹⁄₆₄ inch and ¹⁄₃₂ inch. The sensing head had a purging flow of air to prevent the entrance of foreign matter which was excellent even when the sensing head was under water. The reliability of the sensing signal was considered excellent even when the sensing head was operated under water.

The maximum rates of air flow were computed for the case where the pilot static pressure one foot from the sensing head was 17 pounds per square inch and ¹⁄₁₆ inch inside diameter pilot jets were used using the following formula from Kent's Handbook, 10th edition, page 665: $W = 0.53 A (P/\sqrt{T})$ where W equals the rate of flow in pounds of air per second, A equals the area of the pilot orifice in square inches, P is the absolute pressure in pounds per square inch and T is the absolute temperature. The weight of air was estimated at .0736 pound per cubic foot. The flow of air from each of the pilot jets using this formula was found to be a maximum of 1.8 cubic feet per minute of free air. For the sensing jets, using the same formula, the flow of air was computed to be .3 cubic feet per minute free air per jet for a static pressure of 5 ounces per square inch measured one foot from the sensing head. The total flow of air from the sensing head was thus computed to be 4.8 cubic feet per minute.

By way of further improvement of the preferred embodiment, the high pressure jets 33 and 43 may be defined by sleeves having internal diameters of ¹⁄₃₂ inch where jets 31, 32, 41 and 42 have internal diameters of ⅛ inch. The clearance between the inner face 51a of rib 51 and the opposite surface 30a of the head may be ½ inch instead of ¾ inch. It was found that the high speed jet was diverging more than anticipated so that a smaller cross section jet passage was practical. The smaller cross section jet passage made a considerable reduction in the consumption of the high pressure air to jets 33 and 43, the production of high pressure air being relatively expensive. With the change of jet spacing from ¾ inch to ½ inch, the same substantially 100% reliability is achieved but with lesser jet pressures. In short, the gap between the jets has been reduced, the diameter of the high speed jets has been reduced and the pressure of the high speed jets has been reduced.

The foregoing quantitative data is, of course, given by way of example and not of limitation; it is considered that the giving of specific dimensions and results may assist those skilled in the art in adapting the present invention to a particular situation. The preferences expressed herein are, of course, relative to a particular contemplated application, and it is fully appreciated that other choices may be made under differing conditions and requirements.

Many other modifications and variations will be apparent to those skilled in the art from a consideration of the foregoing examples and embodiments.

I claim as my invention:

A sensing head comprising
  (a) first fluid jet means for emitting a first fluid jet,
  (b) second fluid jet means for emitting a second fluid jet directed toward said first fluid jet means,
  (c) third fluid jet means producing a third fluid jet in addition to and separate and distinct from said second fluid jet and having a different internal pressure than said second fluid jet means and directed toward said first fluid jet means for producing in conjunction with said second fluid jet means a fluid barrier adjacent said first fluid jet means for substantially increasing the internal pressure in said first fluid jet means as compared to the internal pressure in said first fluid jet means in the absence of said fluid barrier produced by said second and third fluid jet means, and (d) means coupled to said fluid jet means responsive to the presence or absence of said fluid barrier produced by said second and third fluid jet means, (e) said responsive means being coupled to said first and second fluid jet means and being actuated by the change in the differential between the internal pressures of said first and second fluid jet means in the presence of and in the absence of said fluid barrier.

References Cited by the Examiner

UNITED STATES PATENTS

| | | | |
|---|---|---|---|
| 2,539,131 | 1/1951 | Gundersen et al. | 73—37.7 X |
| 2,794,444 | 6/1957 | Markey. | |
| 3,115,037 | 12/1963 | Forrester | 73—37.7 X |
| 3,159,170 | 12/1964 | Callan | 73—37.7 X |

FOREIGN PATENTS

| | | |
|---|---|---|
| 1,008,106 | 5/1957 | Germany. |
| 442,365 | 2/1936 | Great Britain. |

LOUIS R. PRINCE, *Primary Examiner.*

ROBERT B. HULL, ISAAC LISANN, *Examiners.*